Oct. 25, 1932.    A. E. HAMILTON    1,885,095
CHUCK
Filed Jan. 24, 1931
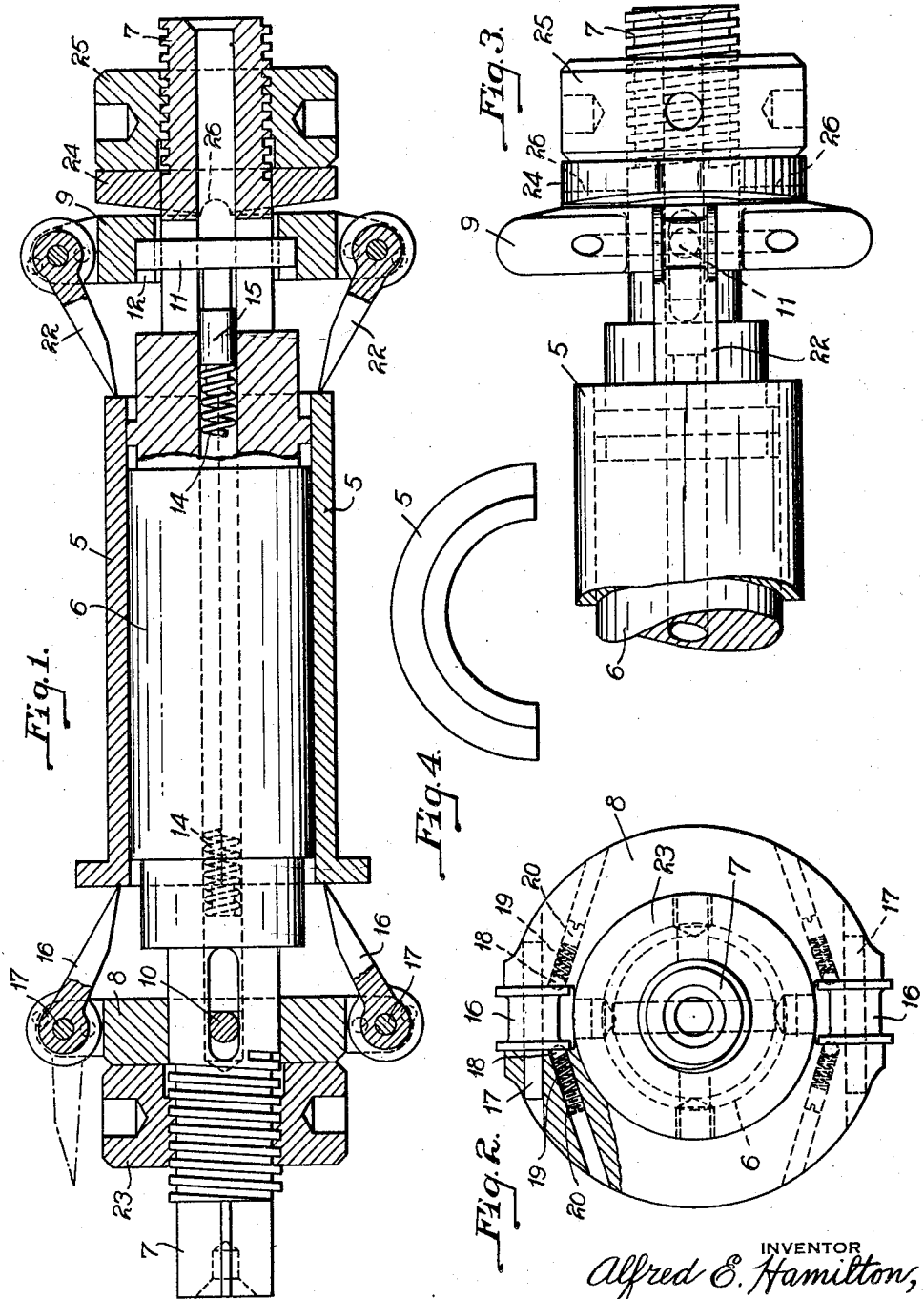
INVENTOR
Alfred E. Hamilton,
By Archworth Martin,
Attorney.

Patented Oct. 25, 1932

1,885,095

UNITED STATES PATENT OFFICE

ALFRED E. HAMILTON, OF PITTSBURGH, PENNSYLVANIA

CHUCK

Application filed January 24, 1931. Serial No. 510,917.

My invention relates to chucks or work-holding devices, and is hereinafter described as employed in connection with the holding of bushings during the operation of cutting them to a desired size and contour, but it will be understood that the invention can be employed as a chuck for holding articles other than bushings.

One object of my invention is to provide a chuck of such form that the outer exposed face of an article to be operated on by a cutting or grinding tool is unobstructed by the work-holding elements, so that the cutting or finishing of the article can be carried through to completion without resetting or changing the position of the article in the chuck.

Another object of my invention is to provide a work-holding device that is of simple form and conveniently operable and which will, nevertheless, hold the work with great rigidity.

Still another object of my invention is to provide a work-holding device that will automatically adapt itself to any unevenness in the article being held.

One form which my invention may take is shown in the accompanying drawing wherein Figure 1 is a longitudinal sectional view of the chuck, with a piece of work in position therein; Fig. 2 is an end elevational view thereof; Fig. 3 is a plan view of a portion of the apparatus of Fig. 1, and Fig. 4 is an end elevational view of a portion of one of the bearing bushings or work shown in Fig. 1 being held in position for cutting.

Bearing bushings for various kinds of heavy machinery or the like are usually formed in semi-circular or semi-cylindrical form and the apparatus hereinafter described is shown as particulaly suitable for holding two such segments of a bushing in position for cutting the periphery thereof to a desired dimension. Heretofore these semi-cylindrical bushings have been held by clamping devices that engage the periphery thereof at certain points, which necessitated first cutting the unobstructed surface portion of the bushing and then resetting the work-holding devices to expose the remaining portion of the bushing. This resetting of the work-holding devices requires considerable time, and furthermore, the work may become slightly misaligned in the chuck on the second setting of the work-holding devices with respect to its position during the first cutting operation. By the use of my invention, the exposed surface of the work upon which the cutting tool is to operate will be entirely unobstructed by the work-holding devices so that continuous cuts can be made from end to end of the work without any resetting of the holding devices.

This is true whether the material being operated on is of cylindrical or semi-cylindrical form, as shown in the accompanying drawing, or of other form. The semi-cylindrical bushings are indicated by the numerals 5. The bushing members 5 are shown as releasably supported on a mandrel 6 that is carried by a shaft 7 which is driven from any suitable source of power by any of various well-known driving mechanisms. The bushing members 5 closely fit the mandrel 6 and are rotated therewith so that they can be operated on by a cutting or grinding tool.

The shaft 7 carries chuck heads 8 and 9 of plate-like form which are slidably keyed to the shaft, by means of pins or keys 10 and 11 respectively, which extend through elongated slots in the chuck shaft into recesses 12 of the chuck heads. The shaft is longitudinally recessed for the reception of a spring 14 and blocks 15 so that the spring 14 will urge the keys 10 and 11, and the chuck heads 8 and 9 outwardly.

A pair of fingers or dogs 16 are pivotally supported in the chuck head 8 by means of pins 17, the hubs of the dogs 16 having serrations or recesses in their sides, into which balls 18 may extend slightly, the said balls being urged inwardly by springs 19 which are held by screws 20 that have screw-threaded engagement with the walls of holes that extend inwardly from the sides of the chuck head. These balls 18 serve to yieldably retain the fingers 16 in various positions. The chuck head 9 is provided with fingers or dogs 22 that are mounted thereon in the same manner as the fingers 16 are mounted on the chuck head 8.

The chuck head 8 is backed by a nut 23 which has openings in its periphery to facilitate operation thereof by a spanner wrench. The nut 23 is, of course, set at such point that the fingers 16 will be properly positioned for engagement with the inner end of a piece of work such as the bushing members 5. When the nut 23 is turned back, the spring 14 will cause the head 8 to follow the nut and maintain seating engagement therewith.

The head 9 is backed by a seating block 24 that is in turn backed up by a nut 25 which may be turned back or unscrewed to permit release movement of the seating block 24 and the chuck head 9 through the expansive force of the spring 14. The outer side of the head 9 has two raised rib-like surfaces 26 that permit slight rocking of the head 9 on the seating block so as to insure that both fingers 22 will properly engage the end of the work.

The bushing members 5 are removed from the mandrel by retracting the nut 25 slightly so that the fingers 22 will be withdrawn from engagement with the ends of the bushing members. Upon insertion of other bushing members, the nut 25 will be turned up to clamp said members between the fingers 16 and 22. The angularity of the fingers when in work-holding position is such that they exert a thrust on the work to hold it tightly against the mandrel, and if the nut 25 is turned tightly enough, the work will be so rigidly held that it will not shift during rotation of the mandrel even though cuts of considerable depth are made therein by cutting tools.

I claim as my invention:—

1. Work-holding structure comprising a mandrel for supporting an article thereon that is curved to approximately the contour of the mandrel, a chuck head disposed adjacent to one end of the mandrel, and fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel.

2. Work-holding structure comprising a mandrel for supporting an article thereon that is curved to approximately the contour of the mandrel, a chuck head disposed adjacent to one end of the mandrel, fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel, and means for adjustably positioning said head in directions longitudinally of the mandrel.

3. Work-holding structure comprising a mandrel for supporting an article thereon that is curved to approximately the contour of the mandrel, a chuck head disposed adjacent to one end of the mandrel, and fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel, the mountings of said fingers being at diametrically opposite points with respect to said axis.

4. Work-holding structure comprising a mandrel for supporting an article thereon that is curved to approximately the contour of the mandrel, a chuck head disposed adjacent to one end of the mandrel, fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel, and means for yieldably maintaining said fingers in various positions about their axes.

5. Work-holding structure comprising a mandrel for supporting an article thereon that is curved to approximately the contour of the mandrel, a chuck head disposed adjacent to one end of the mandrel, fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel, means for adjustably positioning said head in directions longitudinally of the mandrel, and means for tiltably supporting said head against axial thrusts.

6. Work-holding structure comprising a mandrel for supporting an article thereon that is curved to approximately the contour of the mandrel, a chuck head disposed adjacent to one end of the mandrel, fingers pivotally mounted on said head at points farther removed from the axis of the mandrel than the radial dimensions of the mandrel, the said fingers extending in angular directions from their pivotal points toward the axis of the mandrel and adapted to engage the end of an article to hold it against the mandrel, a second chuck head positioned to engage the other end of the article, means for adjustably positioning one of said heads in directions longitudinally of the mandrel, and means for tiltably supporting one of said heads against axial thrusts.

In testimony whereof I, the said ALFRED E. HAMILTON, have hereunto set my hand.

ALFRED E. HAMILTON.